(12) United States Patent
Astwood et al.

(10) Patent No.: US 8,419,886 B2
(45) Date of Patent: Apr. 16, 2013

(54) METHOD OF MANUFACTURING COMPOSITE PARTS

(75) Inventors: Simon Astwood, Bristol (GB); John Jacobs, Bristol (GB); Matthew Hocking, Cirencester (GB); Jago Pridie, Bath (GB)

(73) Assignee: Airbus Operations Limited, Bristol (GB)

(*) Notice: Subject to any disclaimer, the term of this patent is extended or adjusted under 35 U.S.C. 154(b) by 47 days.

(21) Appl. No.: 13/138,551

(22) PCT Filed: Mar. 1, 2010

(86) PCT No.: PCT/GB2010/050357
§ 371 (c)(1),
(2), (4) Date: Sep. 2, 2011

(87) PCT Pub. No.: WO2010/100481
PCT Pub. Date: Sep. 10, 2010

(65) Prior Publication Data
US 2012/0000597 A1 Jan. 5, 2012

(30) Foreign Application Priority Data
Mar. 5, 2009 (GB) .................................. 0903805.0

(51) Int. Cl.
B29C 65/00 (2006.01)
B32B 37/00 (2006.01)

(52) U.S. Cl.
USPC ........... 156/286; 156/185; 156/382; 425/500; 425/501; 425/517; 425/518

(58) Field of Classification Search .................. 156/285, 156/286, 381, 382, 173, 184, 185, 187, 188, 156/189, 190, 191, 194, 446; 425/357–361, 425/383–403.1, 435, 450.1, 500, 501, 517, 425/518
See application file for complete search history.

(56) References Cited

U.S. PATENT DOCUMENTS 5,135,596 A 8/1992 Pabsch et al.
5,443,784 A 8/1995 Celerier et al.
(Continued)

FOREIGN PATENT DOCUMENTS

EP 0 491 353 12/1991
EP 1 162 055 12/2001
(Continued)

OTHER PUBLICATIONS

GB 0903805.0 Search Report, dated Jun. 23, 2009.
(Continued)

Primary Examiner — Katarzyna Wyrozebski Lee
Assistant Examiner — Carson Gross
(74) Attorney, Agent, or Firm — Nixon & Vanderhye P.C.

(57) ABSTRACT

A method of manufacturing two or more composite parts, the method comprising: assembling the composite parts on a mandrel by laying a series of layers of bands of composite material onto the mandrel with a placement machine,—rotating the mandrel as the bands are laid onto the mandrel; attaching two or more debulk frames (10, 11) to the mandrel between opposed edges of the composite parts after the composite parts have been assembled; wrapping the mandrel, debulk frames (10, 11) and composite parts in a debulk bag; heating the composite parts,—forming a vacuum between the mandrel and the debulk bag so that the debulk bag is sucked into voids between the debulk frames and the heated composite parts and progressively presses against the heated composite parts whereby excess material is squeezed by the debulk bag towards their opposed edges; and removing the debulk bag and the composite parts from the mandrel.

11 Claims, 8 Drawing Sheets

U.S. PATENT DOCUMENTS

| | | |
|---|---|---|
| 2007/0175171 A1 | 8/2007 | Delgado et al. |
| 2008/0302486 A1 | 12/2008 | Jones et al. |

FOREIGN PATENT DOCUMENTS

| | | |
|---|---|---|
| FR | 2 691 922 | 12/1993 |
| WO | WO 00/44543 | 8/2000 |
| WO | WO 03/035380 | 5/2003 |
| WO | WO 2008/007140 | 1/2008 |

OTHER PUBLICATIONS

International Search Report for PCT/GB2010/050357, mailed Nov. 5, 2010.

Written Opinion for PCT/GB2010/050357, mailed Nov. 5, 2010.

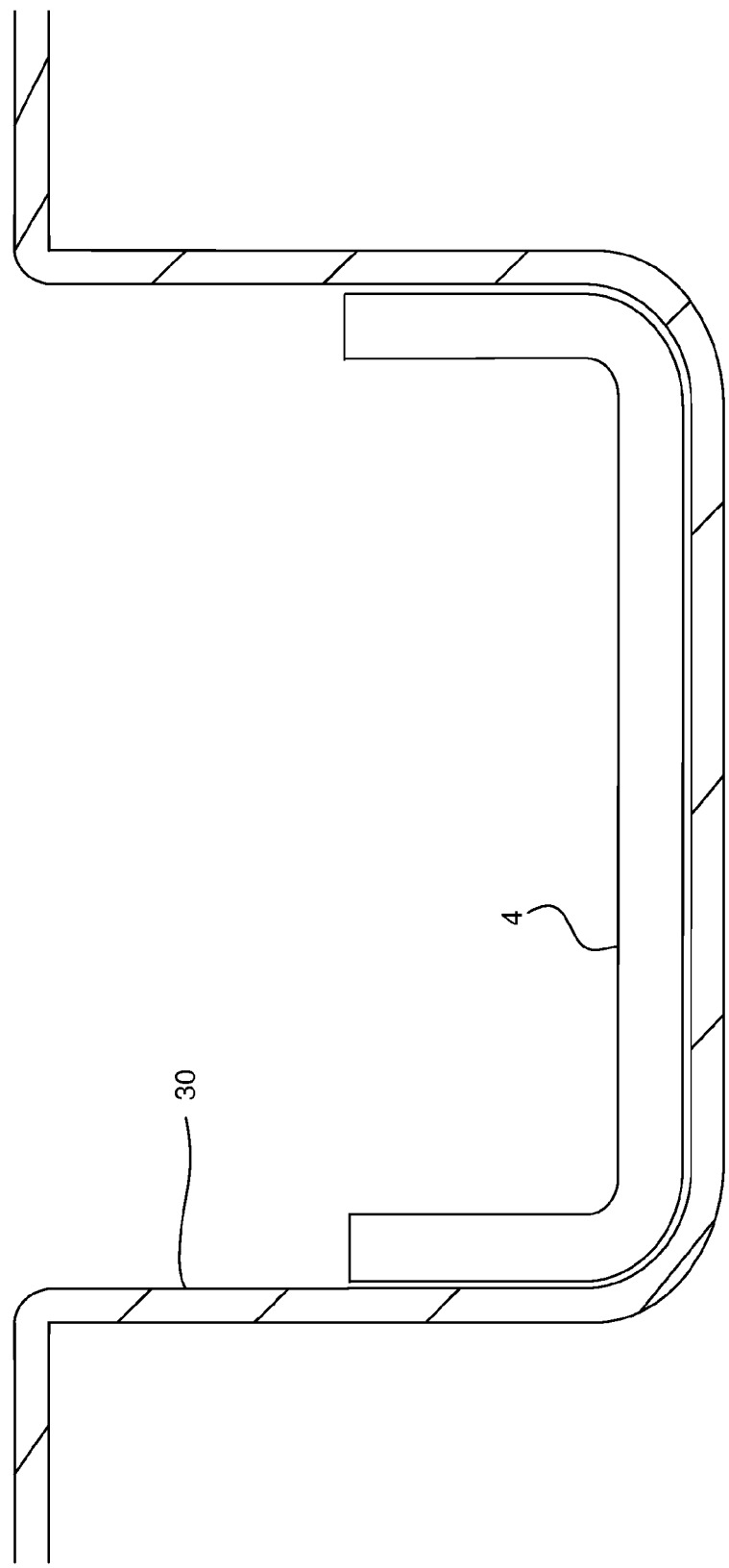

METHOD OF MANUFACTURING COMPOSITE PARTS

This application is the U.S. national phase of International Application No. PCT/GB2010/050357 filed 1 Mar. 2010 which designated the U.S. and claims priority to GB Patent Application No. 0903805.0 filed 5 Mar. 2009, the entire contents of each of which are hereby incorporated by reference.

FIELD OF THE INVENTION

The present invention relates to a method of manufacturing two or more composite parts.

BACKGROUND OF THE INVENTION

It is well known that composite parts reduce in thickness during cure. This process is known as "debulking" and is almost entirely due to the release of entrapped air. Typically the reduction in thickness of a pre-impregnated laminate (commonly known as a "prepreg") is of the order of 10-15%, and for a dry fabric composite the reduction can be even greater. This can become a significant problem when either:
   a) the part is of a significant thickness (typically >10 mm) and is at least partly non-planar; or
   b) the part incorporates padup areas a lot thicker than that of the surrounding material.

A method of hot debulking a composite part prior to cure is described in WO 2008/007140. The part is formed and debulked on a male tool. A problem with this arrangement is that only a single composite part orientation can be manufactured at a time. Therefore if multiple parts are to be hot debulked simultaneously using such standard apparatus they must be positioned tip to tail in the same orientation which will require a long and heavy male tool.

SUMMARY OF THE INVENTION

A first aspect of the invention provides a method of manufacturing two or more composite parts, the method comprising: assembling the composite parts on a mandrel by laying a series of layers of bands of composite material onto the mandrel with a placement machine; rotating the mandrel as the bands are laid onto the mandrel; attaching two or more debulk frames to the mandrel between opposed edges of the composite parts after the composite parts have been assembled; wrapping the mandrel, debulk frames and composite parts in a debulk bag; heating the composite parts; forming a vacuum between the mandrel and the debulk bag so that the debulk bag is sucked into voids between the debulk frames and the heated composite parts and progressively presses against the heated composite parts whereby excess material is squeezed by the debulk bag towards their opposed edges; and removing the debulk bag and the composite parts from the mandrel.

Typically the placement machine presses the bands onto the mandrel. The placement machine may apply a force of 150 kg or higher. This has the advantage that less debulking will be required, but the disadvantage that the high force may cause the mandrel to bend. Therefore more preferably the placement machine presses the bands onto the mandrel with a force less than 150 kg, typically less than 100 kg, and most preferably less than 50 kg. This is particularly important in the case of a mandrel with a relatively high aspect ratio. Typically the machine presses the bands onto the mandrel with a force greater than 10 kg, and preferably greater than 20 kg.

Typically each debulk frame comprises a base which is attached to the mandrel and a distal end around which the debulk bag is wrapped; and each debulk frame is narrower at its base than at its distal end. This enables the bases of the debulk frames to fit within the space between the opposed edges of the composite parts.

The debulk frames may be solid triangles (when view in section) but this will add unnecessary weight. Therefore more preferably each debulk frame comprises a pair of arms which extend on opposite sides of the base, for instance forming a T-shape in cross-section (in which the angle between the two arms is 180°) or more preferably a Y or V shape (in which the angle between the two arms is less than 180°).

The composite parts may be cured on a female tool having a concave surface region, or on a male tool (optionally the mandrel on which the parts are debulked).

Typically each composite part comprises a web which meets a flange at a corner; and the debulk bag initially contacts the web, then progressively bends round the corner and presses against the flange whereby excess material is squeezed by the debulk bag towards an edge of the flange. Thus for example the method may be used to form four L-shaped components (using four debulk frames) or two C-shaped components (using two debulk frames).

The bands of composite material laid by the placement machine typically comprise reinforcement fibres (such as glass or carbon) impregnated with matrix material. The matrix material may be a thermoplastic material or a thermosetting material such as epoxy resin. The placement machine may be a tape laying tool which lays down relatively broad bands of composite material, or more preferably a fibre placement machine which lays down relatively narrow tows of matrix-impregnated fibre. In this case, multiple tows of fibre may be laid at the same time.

In the preferred embodiments described below, the composite parts are spars of an aircraft wing. However the invention may be used to form a variety of other aircraft parts (such as stringers) or parts of other composite structures for (for example) boats, automobiles etc.

A second aspect of the invention provides a kit of parts for manufacturing two or more composite parts, the kit of parts comprising: a mandrel; a support for rotatably supporting the mandrel; two or more debulk frames which can be removably attached to the mandrel; and a debulk bag which can be wrapped around the mandrel and debulk frames.

BRIEF DESCRIPTION OF THE DRAWINGS

Embodiments of the invention will now be described with reference to the accompanying drawings, in which:

FIG. 11 shows one of the spars being cured.

DETAILED DESCRIPTION OF EMBODIMENT(S)

Figure 1:
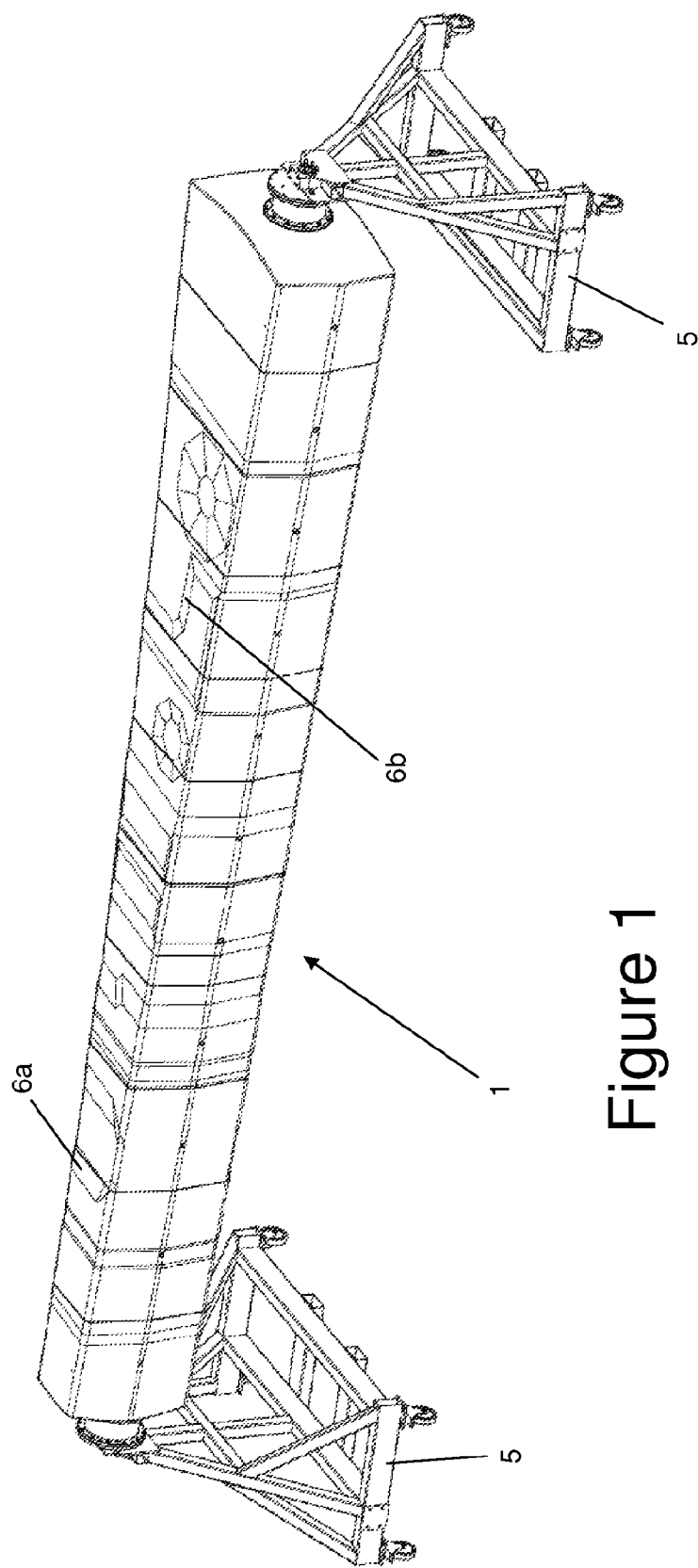
FIG. 1 is an isometric view of a mandrel.

FIG. 1 shows a mandrel 1 mounted on a pair of transport frames and FIGS. 2-10 show a method of assembling and debulking two C-section spars for an aircraft wing using the mandrel 1. The mandrel 1 is formed from a plurality of segments, each tool segment being removably mounted on at least one elongate shaft, as described in further detail in US 2008/0302486, the features of which are incorporated herein by reference. The mandrel segments may be formed from Aluminium or Carbon-Fibre Reinforced Plastic (CFRP), for example.

The mandrel 1 is covered with an embossed Capran (R) vacuum bag (not shown) which is retained to the mandrel by maintaining a vacuum between the bag and the mandrel surface. The embossed (crinkly) feature of the bag allows air to escape via the crinkles/creases.

Figure 2:
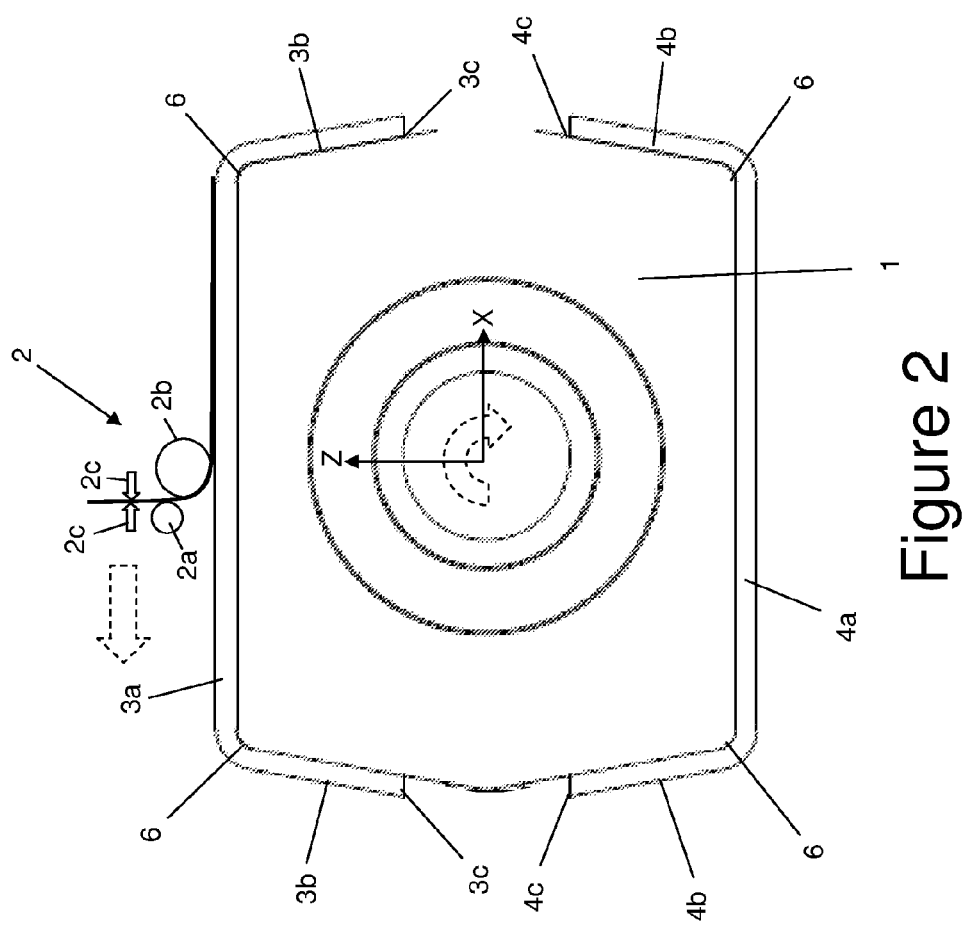
FIG. 2 is an end view showing a fibre placement machine laying fibres tows onto the mandrel.

In a subsequent step shown in FIG. 2, the spars are assembled on the mandrel 1 by laying a series of layers of bands of composite material onto the mandrel with a fibre placement machine incorporating a placement head 2. The spars 3, 4 each have a web 3a, 4a and a pair of flanges 3b, 4b. The flanges of the two spars have opposed edges 3c, 4c separated by a gap. The upper spar in FIG. 2 is a port spar and the lower spar is a starboard spar.

The placement head 2 comprises a guide roller 2a which guides in parallel a band of tows of resin-impregnated fibre from a creel (not shown) into a nip between the mandrel and a compaction roller 2b. The compaction roller applies a force of 28 kg which causes the tows to adhere to the embossed bag or a previously layer of composite material. The tows are heated a little by the placement head 2 which makes the resin tacky and adhere securely.

A cutter 2c upstream of the guide roller 2a can be used to cut one or more of the tows within the band. The placement head 2 is a multi-axis CNC controlled device which can deposit individual or multiple tows of material in any orientation and in any lengths longer than the machine's minimum cut length (distance between the compaction roller 2b and the cutter 2c). The placement head 2 can be rotated and translated with respect to the mandrel, and different tows within the band can be fed at different rates to avoid the formation of wrinkles For instance the outside tow on a curve can be fed at a higher rate to the inside tow. Note that FIG. 2 only gives a schematic view of the head 2 and further details of the fibre placement head 2 will not be presented herein since this type of tool is well know in the art. By way of example the tool may be a Cincinatti Viper 1200. Alternatively, see EP-A-0491353 or U.S. Pat. No. 4,943,338 for details of other suitable fibre placement heads.

Figure 3:
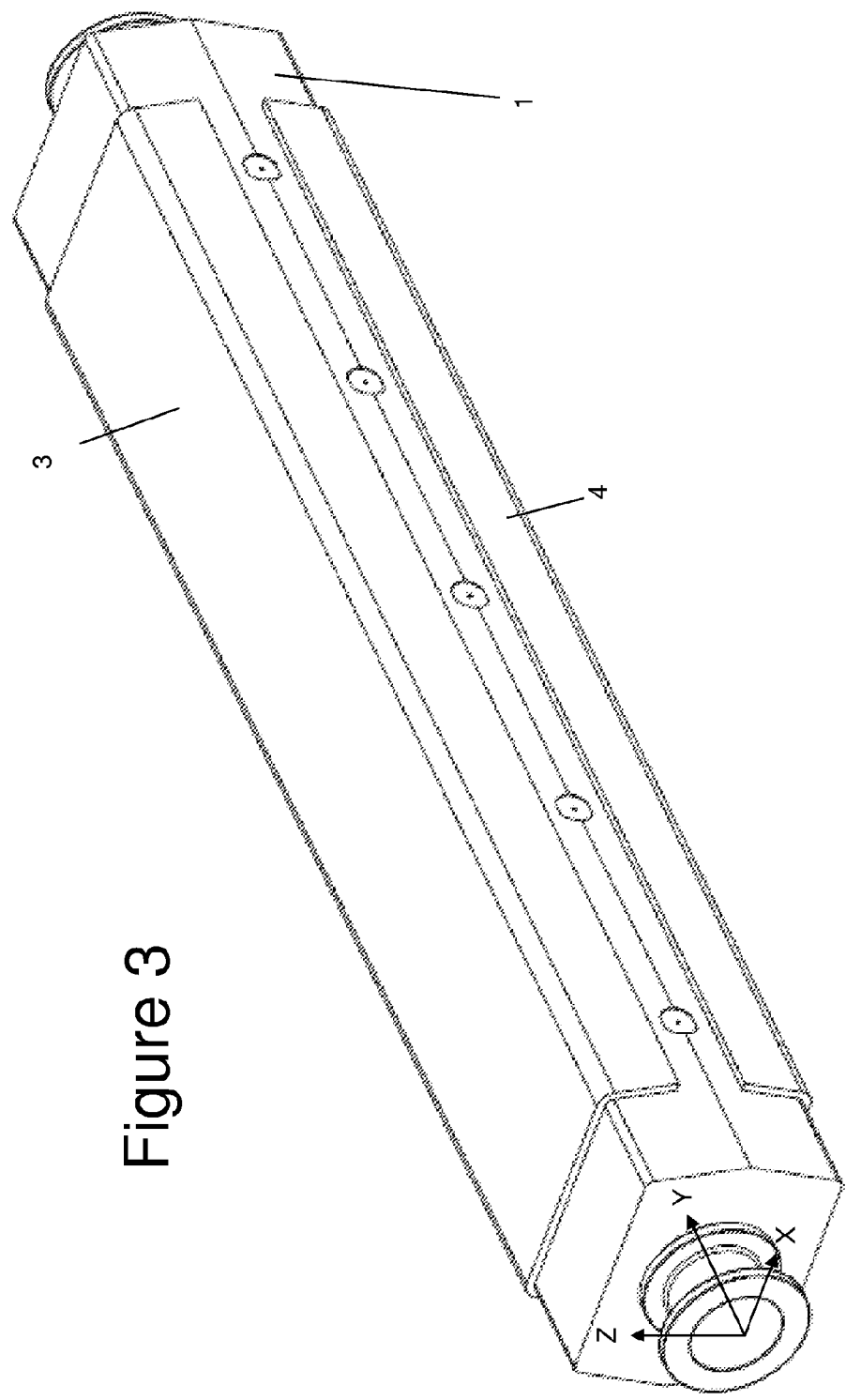
FIG. 3 is an isometric view of the mandrel carrying a pair of spars.

FIG. 3 is an isometric view showing a Cartesian reference frame in which the Y-axis is aligned with the axis of rotation of the mandrel 1. The mandrel 1 has a length L (parallel with its axis of rotation) of the order of 14$m$, and the spar webs have a width of the order of 0.6 m (so the mandrel 1 has an average width W of the order of 0.5 m). As a result of this high aspect ratio (L/W=28) it is important that the compaction roller 2b does not apply too much force to avoid excessive bending of the mandrel. Therefore as the bands are laid onto the mandrel, they are pressed onto the mandrel by the compaction roller 2b with a relatively low force of 28 kg. Also the fibre tows are laid with little or no tension in the fibres, in contrast to a filament winding machine. The relatively low compaction force and lack of tension in the fibres both make debulking of the spars necessary prior to cure.

Plies of composite material in which the fibres run parallel to the Y-axis are known as 0° plies, plies running transverse to the Y-axis are known as 90° plies, and so on. The fibre placement head 2 lays down a stack of plies in a desired stacking sequence, for example 0°/90°/+45°/−45°/90°/0° and so on.

As the bands are laid onto the mandrel, the mandrel 1 is rotated by the headstock and tailstock (not shown) of the fibre placement machine. At the same time the placement head 2 can translate or rotate in any direction. FIG. 2 shows arrows in dashed line indicating clockwise rotation of the mandrel 1 and movement of the head 2 in the negative X direction (i.e. left) but it will be understood that the mandrel 1 and head 2 can be rotated/translated in any direction and completely independently of each other. This enables the tool head 2 to following ramps and corners 6 on the mould surface of the mandrel 1 without building up significant stresses or wrinkles in the composite material. By way of example a span-wise ramp 6a and a chord-wise ramp 6b are labelled on the mould surface in FIG. 1.

The innermost layers of the spars adhere to the embossed vacuum bag sufficiently securely to prevent them from falling off the mandrel under the force of gravity. Optionally one or more retaining bands of 90° tows may also be continued around the entire circumference of the mandrel to join the spars together at selected locations if the adhesion between the spars and the embossed vacuum bag is not sufficient to prevent them falling off.

After the spars have been assembled the fibre placement head 2 is removed. Optionally a set of consumables (not shown) may be wrapped around the assembled spars to allow any entrapped air and volatiles to escape during the hot debulking process described below, and to prevent vacuum bags or membranes from adhering to the spars.

Figure 4:
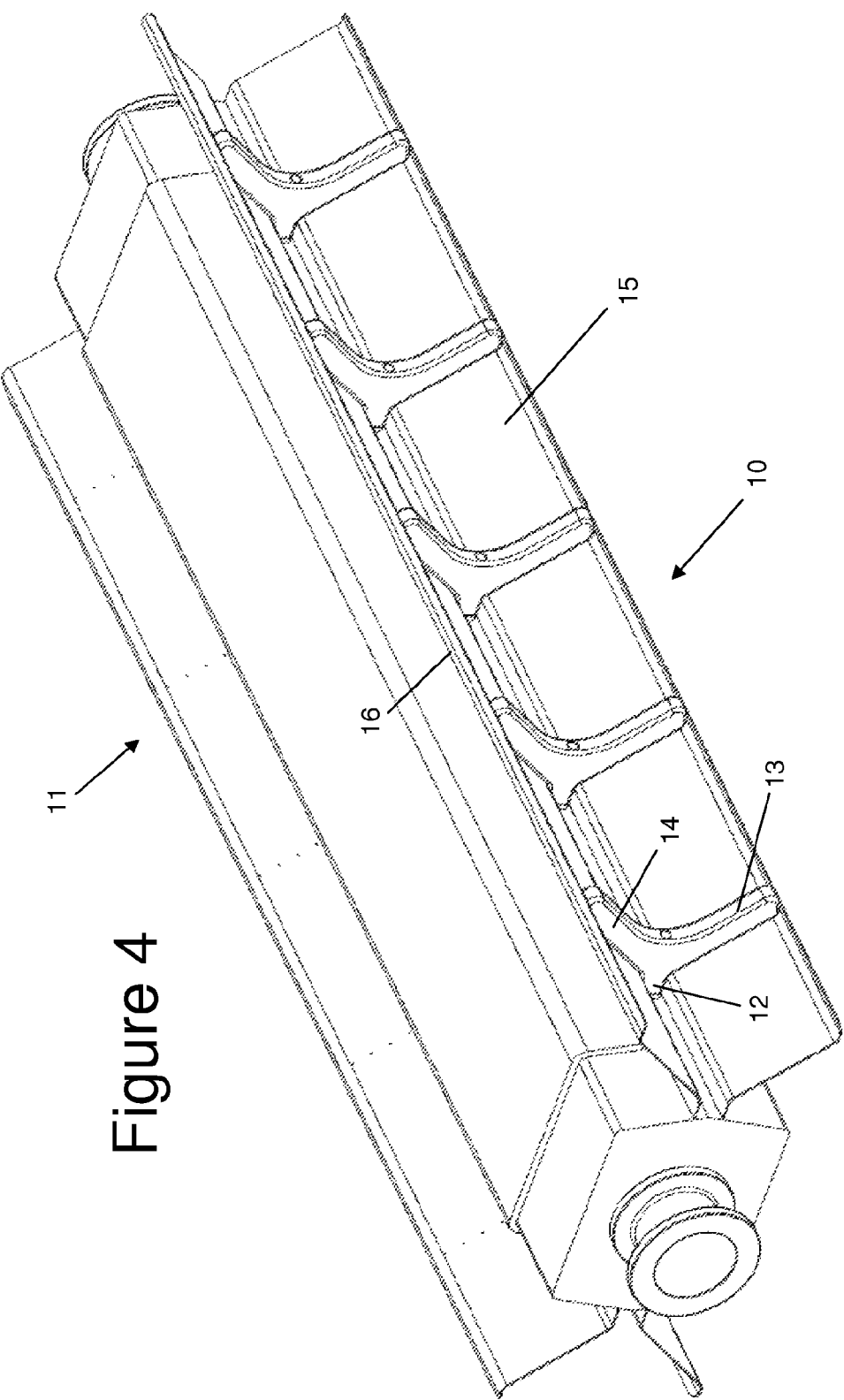
FIGS. 4 and 5 are isometric and end views showing the debulk frames attached.

Two debulk frames 10,11 are then screwed to opposite sides of the mandrel as shown in FIG. 4. The debulk frames 10,11 are identical so only frame 10 will be described in detail. The debulk frame 10 comprises five Y-shaped support ribs. Each support rib has a base 12 screwed into a threaded hole in the mandrel 1 in the gap between the spars, and a pair of arms 13, 14 extending on opposite sides of the base 12. The arms 13, 14 are angled down and up respectively by about 50° as shown most clearly in FIG. 5. The outer faces of the arms 13, 14 carry panels 15, 16 which extend along the full length of the mandrel. The angle between the panels 15, 16 is about 100°.

Next the mandrel, debulk frames and composite parts are wrapped in a debulk bag 20. The debulk bag 20 may be formed from a variety of suitable resilient materials. In a preferred embodiment the bag is made of silicone rubber manufactured by the Mosite Rubber Company of Fort Worth, Tex., with a fleece breather underneath to help trapped air escape.

A vacuum is then formed between the mandrel and the debulk bag so that the debulk bag is sucked into voids 21 between the debulk frames and the composite parts as shown in FIGS. 6-10. This vacuum may be applied via one or more ports (not shown) in the bag 20 or one or more ports (not shown) in the mandrel 1. The bag 20 is pleated at either end to reduce the bag's circumference and adhered to the rim of the headstock and tailstock of the automatic fibre placement machine using bagging tape (flexible putty).

Figure 5:
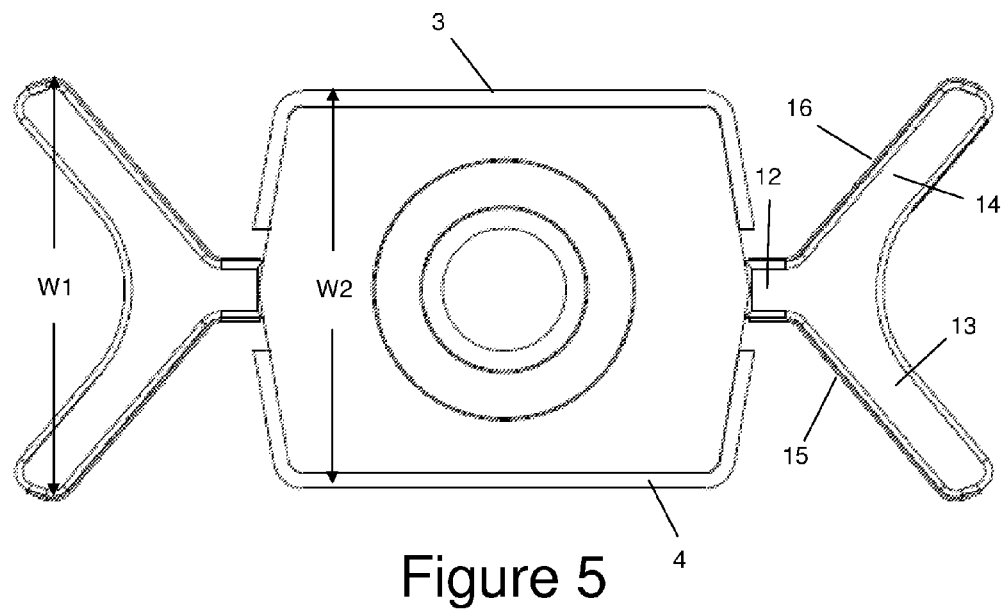

As shown in FIG. 5 the width W1 of the debulk frames perpendicular to the spar webs is slightly greater than the width W2 of the spar/mandrel assembly perpendicular to the spar webs, so before the vacuum is applied the debulk bag only touches the distal ends of the debulk frames 10, 11 without touching the spar webs. Each debulk frame is also significantly narrower at its base than at its distal end so that the base can fit within the gap between the edges of the two spars.

Figure 6:
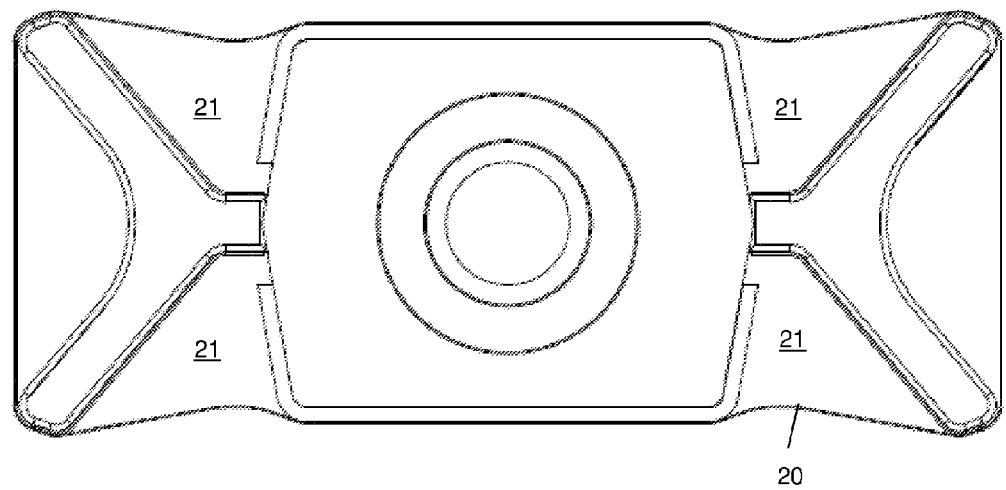
FIG. 6 is an end view showing a debulk bag at a first stage of the vacuum debulking process.
Figure 7:
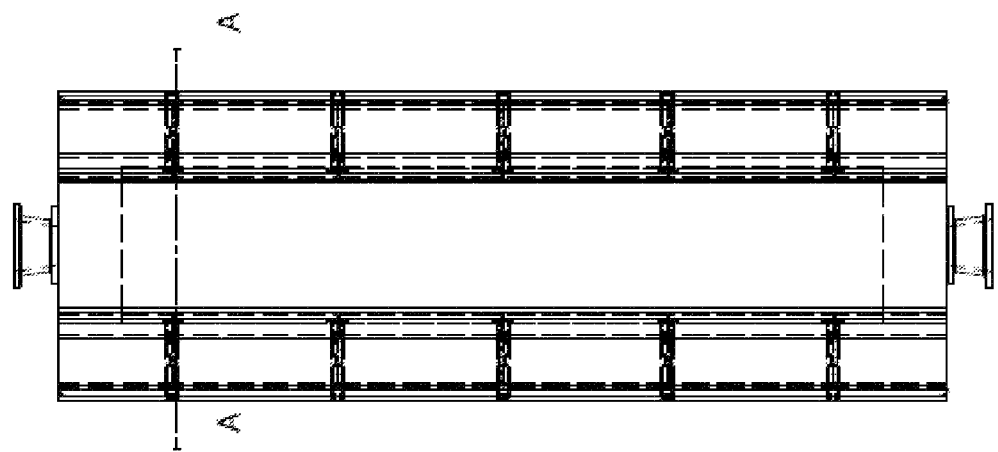
FIG. 7 is a plan view of the assembly.
Figure 8:
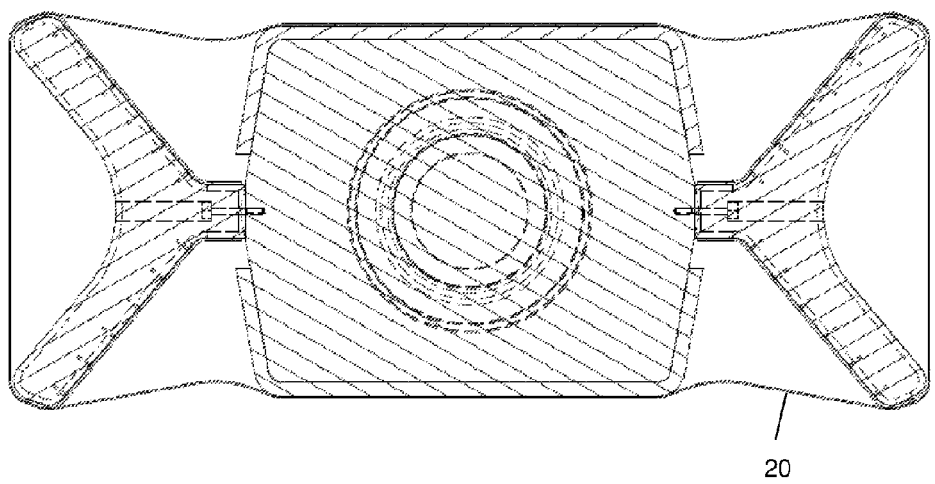
FIG. 8 is a section taken along line A-A in FIG. 7 showing the debulk bag at a first stage of the vacuum debulking process.
Figure 9:
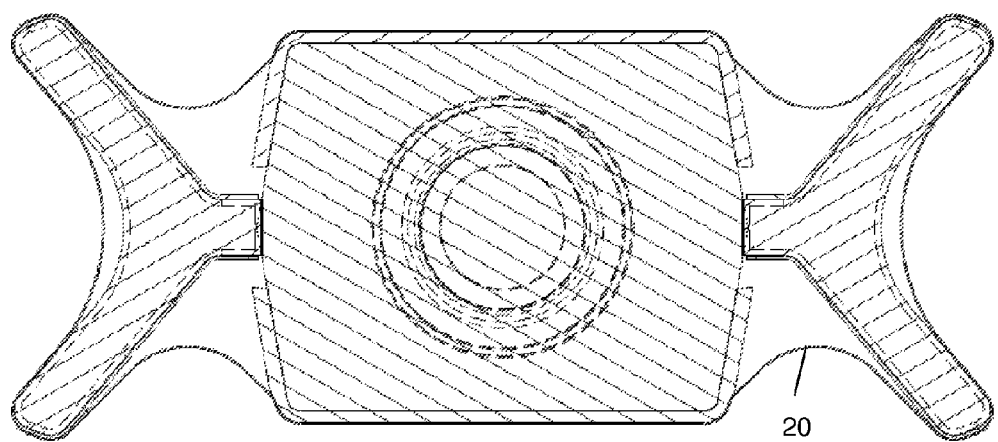
FIG. 9 is section taken along line A-A showing the debulk bag at a second stage of the vacuum debulking process.
Figure 10:
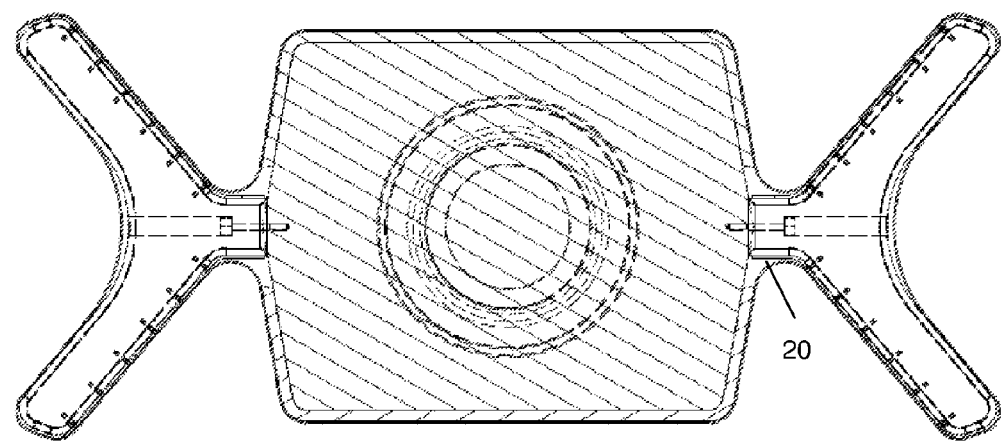
FIG. 10 is section taken along line A-A showing the debulk bag at a final stage of the vacuum debulking process.

As the vacuum is applied the bag 20 engages the webs of the spars as shown in FIGS. 6 and 8 and then starts to bend round the corners where the webs meets the flanges. As the vacuum increases, the bag progressively presses against the flanges as it is sucked into the voids 21 whereby excess material is squeezed by the debulk bag towards the edges of the flanges.

Before and during the application of vacuum, the assembly is brought up to a debulk temperature of 85° C.-95° C. (preferably 90° C.) and held at that temperature for a debulking period. Heat may be applied during debulking by an oven, infrared heating element, or any other means. Optionally, additional debulking pressure may be provided by placing the assembly in an autoclave and applying pressure above 1 bar to the outside of the bag.

The pressure difference across the bag imparts a uniform hydrostatic pressure on all areas of the charge. The bridging of the bag 20 over the voids 21 causes the bag to stretch, giving a stretching force in the plane of the bag which is reacted by the spar where it engages the convex corners 6 of the mandrel. Thus the debulking pressure applied to each spar varies over its surface between a pure hydrostatic pressure (up to atmospheric pressure, or beyond if an autoclave is used) where it engages the less convex approximately planar webs and flanges on the top and sides of the mandrel, and an intensified pressure at the convex corners 6 comprising the stretching pressure added to the hydrostatic pressure.

Debulking of the charge is caused by the combination of pressure and increased temperature during the debulking stage. Debulking is also assisted by the action of the bag 20 which gradually moves down the spar flanges through the intermediate positions shown in FIGS. 8 and 9, squeezing excess air and other excess material out at the edges of the flanges. During debulking the thickness of the spars reduces by about 10%.

After debulking, the bag 20 (and optional consumables) is/are removed; the debulked spars 3,4 are released from the mandrel by removing the vacuum between the embossed vacuum bag and the mandrel and cutting the retaining bands (if used); the embossed vacuum bag is removed from the spars; the spars are transferred to female curing tools; and relevant consumables are applied to the IML of the spars. The female curing tools are then placed in an autoclave and heated to a temperature of approximately 180° C. and pressurised to approximately 7 bar to cure the spars.

An example of one of the spars 4 in a female curing tool 30 is shown in FIG. 11. The spar 4 is net thickness, which means that the IML surface of the spar does not have to move on cure. Therefore the thickness of the spar remains constant during cure in the non-planar corner regions of the spar.

In an alternative process, instead of curing the charge on a female tool 30 as shown in FIG. 11, the charge may be cured on the mandrel 1. In this case, sacrificial plies may be added to the Outer Mould Line (OML) of the spars for machining in order to meet geometric tolerances. The hot debulking process controls the corner profile of the male cured spars, and thus variability in the part radii is reduced and the thickness (or number) of sacrificial plies required is minimised.

Although the invention has been described above with reference to one or more preferred embodiments, it will be appreciated that various changes or modifications may be made without departing from the scope of the invention as defined in the appended claims.

The invention claimed is:

1. A method of manufacturing two or more composite parts, the method comprising: assembling the composite parts on a mandrel by laying a series of layers of bands of composite material onto the mandrel with a placement machine; rotating the mandrel as the bands are laid onto the mandrel; attaching two or more debulk frames to the mandrel between opposed edges of the composite parts after the composite parts have been assembled; wrapping the mandrel, debulk frames and composite parts in a debulk bag; heating the composite parts; forming a vacuum between the mandrel and the debulk bag so that the debulk bag is sucked into voids between the debulk frames and the heated composite parts and progressively presses against the heated composite parts whereby excess material is squeezed by the debulk bag towards their opposed edges; and removing the debulk bag and the composite parts from the mandrel.

2. The method of claim 1 further comprising pressing the bands onto the mandrel with the placement machine with a force of less than 200 kg.

3. The method of claim 1 wherein each debulk frame comprises a base which is attached to the mandrel and a distal end around which the debulk bag is wrapped; and wherein each debulk frame is narrower at its base than at its distal end.

4. The method of claim 3 wherein each debulk frame comprises a pair of arms which extend on opposite sides of the base.

5. The method of claim 4 wherein the angle between the two arms is less than 180°.

6. The method of claim 1 further comprising curing the composite parts on a female tool having a concave surface region.

7. The method of claim 1 wherein each composite part comprises a web which meets a flange at a corner; and wherein the debulk bag initially contacts the web, then progressively bends round the corner and presses against the flanges whereby excess material is squeezed by the debulk bag towards an edge of the flange.

8. The method of claim 7 wherein each composite part comprises a web which meets a pair of flanges at a respective pair of corners; and wherein the debulk bag initially contacts the web, then progressively bends round the corners and presses against the flanges whereby excess material is squeezed by the debulk bag towards a respective edge of each flange.

9. The method of claim 1 wherein the composite parts are aircraft parts.

10. The method of claim 1 wherein the bands of composite material laid by the placement machine comprise reinforcement fibres impregnated with matrix material.

11. The method of claim 1 wherein the mandrel has a length L and an average width W perpendicular to its length; and wherein the aspect ratio L/W is greater than 10.

* * * * *